(12) United States Patent
Schliserman et al.

(10) Patent No.: US 8,391,299 B2
(45) Date of Patent: Mar. 5, 2013

(54) ARCHITECTURE OF GATEWAY BETWEEN A HOME NETWORK AND AN EXTERNAL NETWORK

(75) Inventors: Alberto Schliserman, Modiin (IL); Shai Stein, Hod Hasharon (IL)

(73) Assignee: ECI Telecom Ltd., Petach-Tikva (IL)

( * ) Notice: Subject to any disclaimer, the term of this patent is extended or adjusted under 35 U.S.C. 154(b) by 636 days.

(21) Appl. No.: 12/096,782

(22) PCT Filed: Nov. 14, 2006

(86) PCT No.: PCT/IL2006/001311
§ 371 (c)(1),
(2), (4) Date: Jun. 9, 2008

(87) PCT Pub. No.: WO2007/066318
PCT Pub. Date: Jun. 14, 2007

(65) Prior Publication Data
US 2008/0304500 A1    Dec. 11, 2008

(30) Foreign Application Priority Data

Dec. 8, 2005 (IL) .......................................... 172454

(51) Int. Cl.
*H04L 12/28* (2006.01)
(52) U.S. Cl. ..................................................... 370/401
(58) Field of Classification Search .................. 370/401
See application file for complete search history.

(56) References Cited

U.S. PATENT DOCUMENTS

| 6,317,884 | B1 | 11/2001 | Eames et al. | |
|---|---|---|---|---|
| 6,690,782 | B2 | 2/2004 | Creamer et al. | |
| 6,930,598 | B2 | 8/2005 | Weiss | |
| 7,272,133 | B2 * | 9/2007 | Valin et al. | 370/352 |
| 7,305,477 | B2 * | 12/2007 | Gbadegesin | 709/227 |
| 7,356,031 | B1 * | 4/2008 | Toebes et al. | 370/392 |
| 2005/0027887 | A1 * | 2/2005 | Zimler et al. | 709/249 |
| 2005/0117605 | A1 * | 6/2005 | Yan et al. | 370/469 |
| 2006/0168354 | A1 | 7/2006 | Hutter | |
| 2007/0233883 | A1 * | 10/2007 | De Lutiis et al. | 709/229 |

FOREIGN PATENT DOCUMENTS

| EP | 1427142 A1 * | 6/2004 |
|---|---|---|
| WO | 2005004404 A2 | 1/2008 |

OTHER PUBLICATIONS

Roch H. Glitho, et al., "Developing applications for Internet Telephony: A case study on the use of Parlay call control APLS in SIP Networks," May 2005, pp. 48-55, vol. 18, No. 3, IEEE Network, New York.

Mark Dowker, et al., "Technical Report DSL Forum TR-094," Aug. 2004, pp. 1-51.

http://www.parlay.org/en/specifications/, Jun. 8, 2008.

* cited by examiner

*Primary Examiner* — Mark Rinehart
*Assistant Examiner* — Maharishi Khirodhar
(74) *Attorney, Agent, or Firm* — Browdy and Neimark, PLLC

(57) ABSTRACT

A Home Gateway (HGW) interconnects a Home Network (HN) and an External Network (EN), and is adapted to communicate with the HN and EN at a Network layer. HGW is provided with a Service Application Programming Interface Layer (SAPI Layer) capable of performing, at an Application layer, mediator functions for supporting communication and services between the HN and EN. Devices of the HN are able to communicate with devices of EN via the HGW, and to actualize services via the HGW.

9 Claims, 5 Drawing Sheets

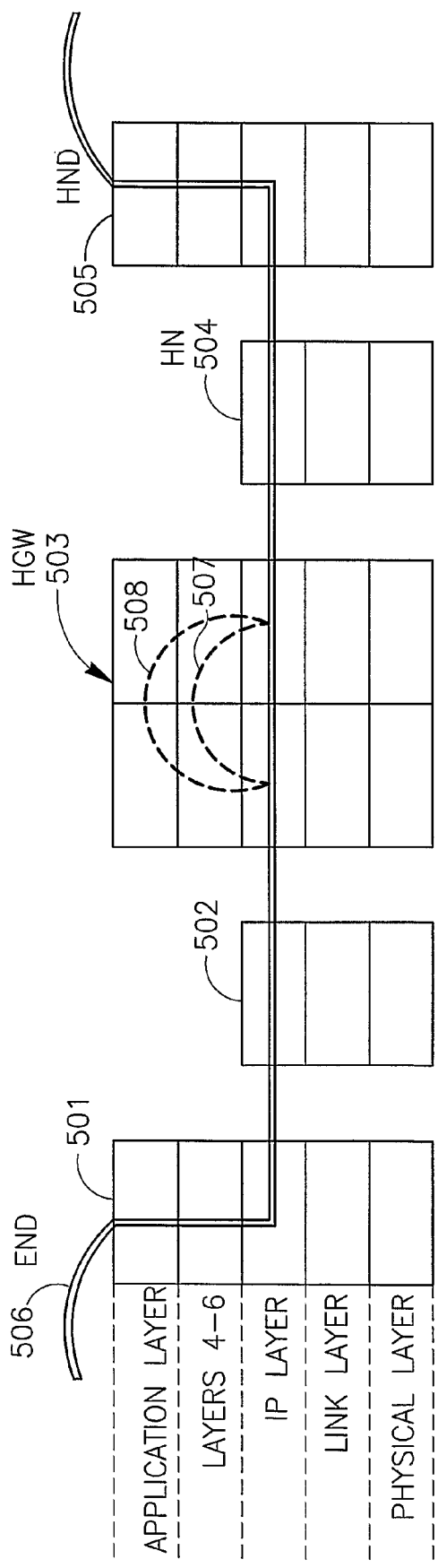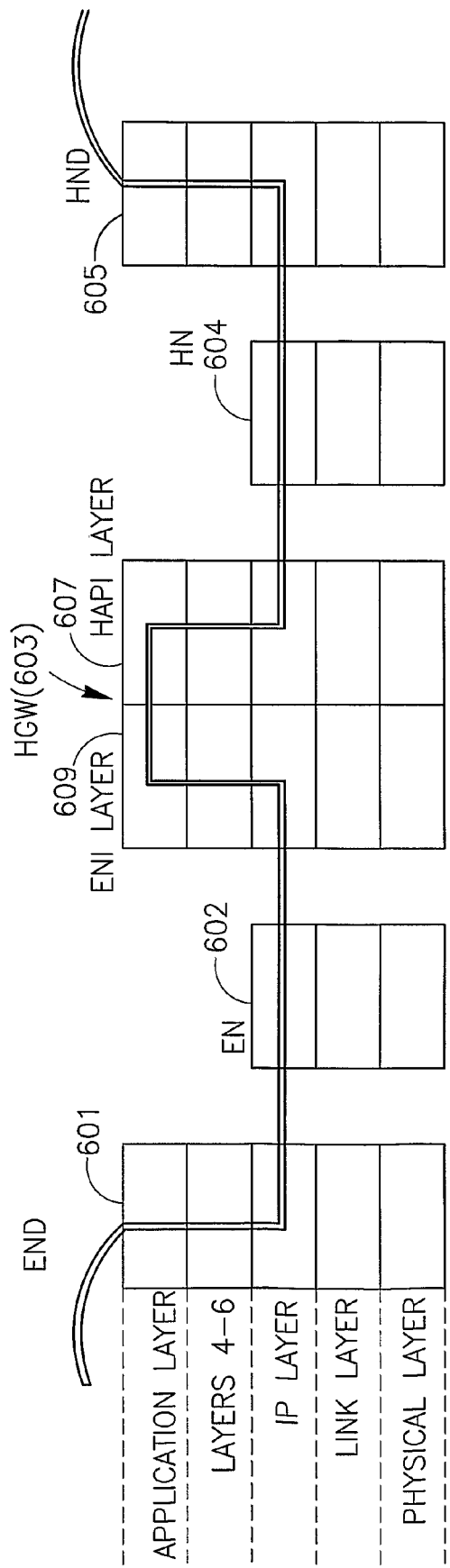

ARCHITECTURE OF GATEWAY BETWEEN A HOME NETWORK AND AN EXTERNAL NETWORK

FIELD OF THE INVENTION

The invention relates to the field of services for the home user in the broadband networks environment. In particular, the present invention relates to architecture of a gateway intended for supporting both communication between a home network and an external network, and services for users of the home network.

BACKGROUND OF THE INVENTION

The design and creation of services in the Home Network Environment has encountered many hurdles, the biggest is the need for every device on the network to be able to communicate with the different servers in the Home Network (HN) and in the outside External (say, Internet) Network. Although many protocols standardized many various services, the current technology is still oriented to specific services and does not provide the flexibility to create new services without going through the whole process of standardization of the new services from end to end with all participants in the service actualization process.

Presently existing home or residential gateways between a home network and an external network (such as Internet, Ethernet, etc.) are capable of supporting communication between the two networks and enable providing some basic services for users of the home network (for various network devices). However, it should be noted that the mentioned capability is ensured by using (or providing) quite complex hardware and software means both at the side of home network devices, and at the side of servers of the external network (such as IP servers). Any new and/or technologically advanced service which is desired for the home network devices becomes problematic (beginning from just installing and connecting a new home network device, up to any novel service requiring participation of a group of network devices of the interconnected networks). The problem stems from the need of intervention into the existing software architecture of the home network devices, of the home gateway and/or of the external networks services, and thus from the need of seeking and producing new program "patches" for performing each of the newly required services.

FIG. 1 (prior art) illustrates a well known and widely used architecture of a Home (or Residential) gateway RG (110), serving a home network 100 where each of the home network devices HND1-HNDN (101-104) is intrinsically capable of communicating with an external network 120 via the Home gateway 110. In this example, the external 120 network is IP network which may further be referred to as IN. Network devices of the IP network 120 are represented by a number of servers IS1-ISN (121-124). FIG. 1 depicts the standard methodology for creation of services in the home network 100. Home Network Devices HND 101-HND 104 must all be IP capable (with either integrated IP capabilities or an additional adaptor device). HNDs may have Ethernet or IP connectivity among them over the Home Network (100). When a need arises to reach an external server, an HND creates service related sessions via the Residential Gateway (110). The RG (110) provides various connectivity services to the Home Network: Bridge Services (111), Router Services (112) which may include Network Address Translation NAT and Firewall, Proxy Services (113) and Application Level Gateway Services (ALG 114). Using any of these connectivity services, the Home Network Device (say, 101) sends messages over the Internet Network (120) and reaches the necessary servers that take care of the message.

A schematic example of a simple service can be seen in FIG. 2 (prior art), illustrating the message interplay related to a Content Retrieval service (the details are provided to demonstrate the complexity of the service performed by the prior art gateway). First phase (211) demands IP initialization of the Home Network (Residential) Gateway RG (202) from a Dynamic Host Control Protocol DHCP Server (203). Then Home Network Devices (generally marked 201) get their Local IP addresses from the RG (202). Second Phase (212) includes Configuration of the HND (201) by an Auto-Configuration Server ACS (204). Third Phase (213) is the phase where the HND 201 can access the content, which is provided by HTTP Server (205). The service creation and service actualization for other services is even more complicated then the content retrieval service. In other services different protocols can be involved (e.g. SIP or H.232), other servers can be used (Call Server, Video Servers).

In case the desired service demands a combination of services (e.g., a combination of voice, data, and video), specific applications—say, similar to "Net-Meeting" must be built on a PC-like device for that specific service, without having a possibility to use them for other services.

In parallel to the service actualization, the end-to end network must be configured to support the service. In the solutions that exist today, these tasks are split between the service provider (from server to the residential or home Gateway) and the user (from the Gateway to the HND). Harmonization of these tasks is still under debate; either RG will take care of assuring end-to-end requirements or external controller will do it as part of IMS (IP Multimedia Subsystem) concept.

Addresses of Network layer commands arriving to the Gateway either from the side of Home Network or from the side of External Network have to be translated, in any direction. The function of coordination the Home Network Devices addresses with External Network (IP) addresses is usually performed with the aid of modules like NAT (Network Address Translation), ALG 114 (Application Level Gateway) or Proxy. NAT is indicated as 206 in FIG. 2, ALG and Proxy are respectively marked as 114 and 113 in FIG. 1.

In presently known solutions, many of the HN attributes are discovered, configured and directly controlled by the IN or Service providers (e.g. Technical Report DSL Forum TR-094, (August 2004) www.dslforum.org/techwork/tr/TR-094.pdf.

Having described today's solution for service creation and delivery, it is evident that any attempt to introduce new services demands understanding of Home Network technologies, Provider Network architectures and protocols, as well as the capability to integrate all technologies into a valid end-to end service delivery platform.

U.S. Pat. Nos. 6,930,598 B2 "Home Gateway Server Appliance" and U.S. Pat. No. 6,317,884 B1 "Video, Data and Telephony Gateway" describe various solutions that still do not solve the problem of cumbersome and complex coordination of services and protocols of different inter-communicating networks, as well as the problem of intrinsic capabilities of different network devices belonging to these different networks.

A relatively novel technology called PARLAY (http://www.parlay.org/en/specifications/) has been developed for supporting telecommunication services between a number of standard network applications and a telecommunication network. The Parlay Group aims to link Information Technology (IT) applications with the capabilities of the telecommunications world by specifying and promoting application programming interfaces (APIs) that are easy to use, rich in functionality, and based on open standards. Parlay integrates telecom network switches with IT applications via a secure, measured, and billable interface. Parlay presents the notion of an API that allows applications to interface the Telecommunication Network (for example, a central office of a PSTN network) with the aim to allow multiple network services to be then offered to telephony users.

U.S. Pat. No. 6,690,782 B2 describes a way of implementing the Parlay concept between an application layer, a service layer and a protocol layer of a telecommunications network. Neither Parlay, nor the U.S. Pat. No. 6,690,782 B2 has reference to a home network, specific home network devices, nor specific home network services.

SUMMARY OF THE INVENTION

The Inventors point out that there has been a long felt need of providing such a home (residential) gateway for interconnecting a home network with an external network, which would overcome disadvantages of the presently used home gateways, i.e. would alleviate communication between the home network and the external network, and creation of various new services for users of the home network. Providing such a home gateway is the object of the invention.

To achieve the above object, this invention proposes a new architecture of a home gateway (HGW) to be placed and utilized for communication and service actualization between a home network (HN) and an External Network (EN), the HGW being adapted to communicate with the HN and EN at a Network layer and being provided with a Service Application Programming Interface Layer (SAPI Layer) capable of performing, at an Application layer, mediator functions for supporting communication and services between the HN and the EN.

More particularly, when the HN comprises a number of different home network devices (HNDs) and an external network (EN) comprises one or more external network devices (ENDs), said SAPI Layer of the HGW enables any one of the home network devices (HNDs):
 a) to communicate with one or more of the external network devices ENDs via the HGW, by utilizing said network and service mediator functions of the HGW, regardless of the fact whether any of said HNDs has individual capability of communicating with any of the external network devices ENDs);
 b) to order from the HGW and acquire there-from services involving participation of one or more network devices belonging to any of the HN and EN (i.e., any network devices selected from HNDs and ENDs).

In other words, the preferred embodiment of the HGW, which should probably become widespread or even standard in the closest future, ensures communication and services for said different HNDs even in case when no one of the HNDs has individual capability of communicating with the ENDs. The new architecture of HGW will therefore result in a possibility for a user to utilize simple and economic HNDs, and in the long term—in simplifying all types of home network devices HNDs.

The proposed invention also allows the communication and actualization of services in the opposite direction too, by enabling network devices belonging to the external network (ENDs) to communicate with the network devices of the home network via the HGW by utilizing the novel mediator functions of the HGW. Preferably, the External Network is an Internet Network.

Actually, the proposed concept aims at creating a so-called service level partitioning between the Home Network and the External (or Provider) Network. The architecture presented in the present description resolves the complexities of service creation and actualization from the "user side" of the network (i.e., from the Home network) and creates a Service Application Layer between the user side and the External Network, so that the Service Application Layer masks the complexities of the External network beyond the Residential (Home) Gateway.

The main component of the Service Application Programming Interface Layer in the novel architecture of the HGW is formed by a group of Home network Application level Programming Interfaces (HAPIs or HAPI modules) that together compose a Home Network Application Layer (HAPI Layer). Each of said HAPIs being designed to present a predetermined Application level Programming Interface (API) to at least one of the home network devices HNDs. The Home Network Application layer will be further shortly referred to as HAPI layer.

The HAPI layer of the SAPI Layer (Service Application Programming Interface Layer) can be defined as comprising a functionally complete set of Home network Application Programming Interface modules (HAPIs). The functionally complete set of HAPIs can be understood as such a set of interfaces that enables performing within the HGW at least the functions that otherwise would have to be performed by said individual capabilities (interfaces) of all the HNDs connected to said HGW. It should be kept in mind that the mentioned individual capability or interface of a Home Network Device HND supports communication and services between the HND and the External Network EN).

The functionally complete set of HAPIs in the HAPI layer therefore makes unnecessary said individual capabilities of the HNDs, i.e. HNDs could be produced without their complex individual interfaces.

Owing to the above-described features, the Service Application layer (SAPI) Layer is adapted to perform services within the Home Network, access the External Network (usually Internet) for services outside the home network and combine services from both within the Home and in the External Network.

The SAPI Layer allows home network devices to provide new services for the home network user (that activates HND) without being aware of the details of the home network and its devices nor the External Network behind the Home Gateway. Since the SAPI Layer represents the services capabilities of both Home Network and its devices and the External Network and its devices, the home network user's access to services at the external network shall be performed by activating specific HAPI(s) that own the capability to reach the external network servers. Similarly, access of the home user to services within the home network is also performed by activating one or more specific HAPIs and their interaction with one another and the relevant HNDs. In view of the above, the new architecture of HGW allows easy development of services for the home user, based on using the HAPI layer and developing it by programmers of any qualification.

In other words, the plurality of HAPIs modules of the HAPI Layer shall allow easy creation and actualization of services by service programmers, even by those unable to understand the technologies behind the services both within the Home Network and in the Outside Provider (External) Networks, since the creation of a modified or new service would require just composing a specific group of HAPI modules and actualizing thereof in a predetermined order of interaction.

The creation of a unified and, probably—of a standardized SAPI Layer (and a standardized HAPI Layer), means that Home Network devices will be able to get services from the External Network and shall facilitate many new services that cannot be implemented with currently known capabilities of residential (home) gateways.

From the point of protocol layers, the invention can be formulated as proposing a Home Gateway (HGW) architecture for providing communication and/or service via a Home Gateway (HGW) interconnecting a Home Network and an External Network, and capable of terminating any one of incoming Network layer communication and/or service commands and converting them into Application layer commands, handling the Application layer commands within the Home Gateway for ensuring required services and establishing required communication, the HGW further converting the Application layer commands for issuing outgoing commands as Network layer commands.

It is the Service Application Programming Layer (SAPI layer) of the HGW, who is responsible for translating all Network layer commands, incoming the HGW from either the Home Network Devices or the External Network Devices, into Application layer commands and of handling said Application layer commands at the SAPI layer; the SAPI layer is also responsible for outputting said Application layer commands either towards the Home Network Devices or the External Network Devices in the form of Network layer commands.

More specifically, and in a particular case the proposed HGW is intended for communication and service actualization between an external network (EN) and a home network (HN) comprising a plurality of home network devices (HNDs), said HGW is provided with a plurality of Home Application Programming Interface (HAPI) modules forming a Home Network Application Layer (which can be shortly called HAPI layer) in the HGW; the Home Gateway HGW being operative:
  a) to translate Network layer (usually, IP) commands received from said HNDs and requesting communication and/or services involving participation of the EN, into Application layer commands, to handle said Application layer commands at the HAPI layer, to re-translate said Application layer commands back to the IP layer commands and to forward thereof to the external network (EN).
  b) to translate Network (IP) layer commands received from said EN and intended for the HN, into Application layer commands to handle the Application layer commands at the HAPI layer, to re-translate said Application layer commands back to the IP layer commands and to forward thereof to the home network (HN).

It should be noted that since the HGW is capable of translating any incoming Network layer commands into Application layer commands, the commands incoming the HGW from said HNDs and is not requesting communication and/or services involving participation of the ENDs (e.g., related just to internal home network services and/or communications), will also be translated into the Application layer commands to be handled at the HAPI layer for further re-translating said Application layer commands back to the IP layer commands to be issued to the Home Network Device(s).

It should further be noted that the SAPI layer of the Home Gateway HGW may also comprise an External (or Provider) Network Interface Layer—ENI layer—for serving network devices of the EN (ENDs). ENDs, for example, may be IP Servers).

The External Network Interface Layer preferably has functions with respect to the External Network EN, analog to the functions, which the HAPI layer has with respect to the Home Network HN.

When the SAPI layer comprises the HAPI layer and the ENI layer, the internal communication within the SAPI layer between the HAPI layer and the ENI layer is preferably provided at the Application layer commands.

One of the major advantages of this invention is the creation of a unite and stable demarcation point between HN and EN (say, Internet network IN). This function is performed by the SAPI Layer within the HGW. The Unite Demarcation Point solves several problems that exist in today's networks when HN is a sub-network within the IN. The unite demarcation point is efficient both at the network layer and at the service layer.

Network Layer Demarcation

The IP Layer Addressing of the two realms IN and HN may be completely separate. The interface between the two networks is at the service (application) layer over the SAPI (not at the network layer over IP).

This means that there is no need to perform at the HGW any Network Address Translation that causes problems for many applications (e.g. L3 VPN, VoIP) and demands application specific algorithms to correct the problems caused by network translation (e.g. Application Level Gateways for many on line gaming services) Instead of that, the HGW performs translation of incoming IP commands into commands of the Application layer to be handled in the SAPI layer of HGW, and also performs translation of Application layer commands into outgoing IP layer commands.

Service Layer Demarcation

The HGW performs all the tasks needed for services of the two networks. The HGW will perform the requests of the HN via the HAPI and all the tasks and services required by the IN (EN) entities over the applicable protocols of the ENI layer.

The HGW may be trusted by both providers (Network and Services) so there is no need to make other HNDs trusted (although the HGW can serve as a relay if the HND must be a trusted device).

Creating a clear demarcation between HN and IN is not mandatory but it may appeal to some of the network providers. The demarcation point does not preclude the possibility to offer Remote HN Management Services. The remote Management shall be relayed via the HGW as any other service.

This demarcation point shall reduce the amount of knowledge the IN provider or Services provider have about the HN and HNDs on it.

The HGW will transfer only data that is requested by server when requested. This makes the HN a separate network that does not have to be discovered and directly controlled by the service provider. Remember, that in the prior art many of the HN attributes where discovered, configured and directly controlled by the IN or Service providers.

In order to implement the above-mentioned objectives concerning developing new services for the Home Network, HAPIs forming the HAPI layer preferably have specific structure and format.

HAPI shall have the format of a client-server API. Depending on the side that needs a service done, than some HAPI will behave with HGW as a Server and with HND as Client. Other HAPIs shall behave with HND as a Server, and with HGW as a Client.

Each HAPI shall have a Name, HAPI Attributes, HAPI Methods and an HAPI implementation Sequence.

HAPI Name: identifies the specific HAPI between client and server.

HAPI Attributes define the parameters exchanged between the client and server.

HAPI Method defines the action requested by the client to be performed by the server.

The HAPI implementation sequence shall define the message interplay and activities performed by the client or server at each step of the process. The implementation process shall also define irregular behavior and the actions to be taken in case of irregular conditions: errors in message, communications problems, SW and HW problems.

Without limiting the technology, the invention presents two preferred HAPI Classes in the HAPI Layer:

Class 1: HAPI Class for complete services (i.e a HAPI module ensuring a complete service for performing a specific task)

Class 2: HAPI Class Building Blocks i.e. HAPI modules that allow the generation of new services by creating new HAPI combinations.

In addition to the HAPI Layer HAPI's, the HGW preferably comprises a Home Network Services Framework (HNSF) module capable of providing generic services to the HAPI layer (to any of the HAPIs) and to the Provider Network Interface Layer. The HNSF is considered to be part of the HAPI Layer.

For example, HNSF may handle all real time issues for the HAPI layer and the Provider (external) Network Interface Layer.

Other types and combinations of the HAPI modules will be discussed as the description proceeds.

According to a second aspect of the invention, there is provided a system comprising the new Home Gateway (HGW), wherein the system also includes a Home network with Home Network Devices and an External Network with its entities (ENDs), the Home network and the External Network being capable of communicating with one another via the HGW.

According to yet another aspect of the invention, there is proposed a method of providing communication and/or services via a Home Gateway (HGW) interconnecting a Home Network and an External Network, the method comprising
- converting all Network layer communication and/or service commands incoming the (HGW) either from the Home Network or from the External Network, into Application layer commands,
- handling the Application layer commands within the HGW for ensuring required services and/or establishing required communication,
- issuing commands outgoing from the HGW either to the Home Network or to the External Network, as Network layer commands.

More particularly, the method includes preliminarily providing in the HGW a Service Application Programming Interface Layer (SAPI Layer) comprising a functionally complete set of Home network Application Programming Interface modules. As has been explained above, the functionally complete set can be defined as such a set of interfaces that enables performing in the HGW, at its SAPI layer, at least the functions that otherwise would have to be performed by said individual capabilities (interfaces) of all the HNDs belonging to the HN and connected to said HGW. We keep in mind that the individual capabilities (or interfaces) of the HNDs are to be understood as enabling to the HNDs communication with the EN and/or support services involving the ENDs.

An additional subject of the invention is a software product comprising software implementable instructions and/or data for carrying out the above-described method, as well as a carrier medium carrying the software product.

BRIEF DESCRIPTION OF THE DRAWINGS

The invention will be further illustrated with reference to the following non-limiting graphical examples, in which:

FIG. 5 schematically illustrates a multi-layer diagram of service traffic via a conventional Home Gateway HGW.

FIG. 6 schematically illustrates a multi-layer diagram of service traffic via the new HGW proposed in the present invention.

DETAILED DESCRIPTION OF THE PREFERRED EMBODIMENTS

In view of the principles stated above, and taking into account specific features, which will be described below in more detail, the present invention proposes:
- An architecture of Home (Residential) Gateway, comprising of a HAPI Layer that allows Home Network Devices of all types to communicate among themselves and with External (Internet) Network servers of all types;
- The new HGW with the HAPI Layer becomes a clear and unite demarcation between External (Internet) Network and its entities and Home Network and its devices.
  - the demarcation at the network layer means that network addresses at the two sides of HGW do not have to be translated in any direction. Network layer commands are completely translated into Application layer commands. Both the communication and services are both handled exclusively at the Application layer via the HAPI Layer from the HN side and via Internet Services (ENI layer) at the External Network side. This invention solves the need for coordination of HN addresses with IN Addresses via processes like NAT, ALG or Proxy;
  - Service Level Demarcation provided by the HAPI Layer means that services are terminated at the HGW(RG), on both sides thereof. The HGW handles the services from side to the other at a service level, and HNDs use the HAPI layer as their interface to invoke services from HGW, and through HGW indirectly from the External Network,
- The HAPI Layer can be built by various classes of HAPI and a Framework HAPI, for example HAPI can be a HAPI module to a complete service, a building block module for services or a HAPI module to any of the services provided by the framework in the HAPI Layer, HAPI module allowing OAM Procedures for HGW and HNDs; HAPI modules allowing real time streaming services through the HGW at a service level; other expanded classes of HAPI;

Owing to the new architecture of the HGW, the HNDs do not need to have individual capabilities (interfaces) for supporting communication/services with one another and with ENDs across the networks, since all the required interfaces (the so-called functionally complete set of HAPIs) are provided in the HGW. The new architecture of HGW allows easy creation of new and modified services for HNDs, since this process does not require knowledge of HNDs, ENDs and high qualification from users, programmers and providers. For example, newly created advanced services for HNDs may be a) providing popping up messages concerning all HNDs in a display of an HNDs presently active; b) providing home maintenance or household operations by remotely controlling HNDs by e-mail, etc. Combinations are numerous, and can be dictated and limited only by the number and nature of HND devices connected to the HGW and the set of HAPIs currently available in the HGW.

Figure 3:
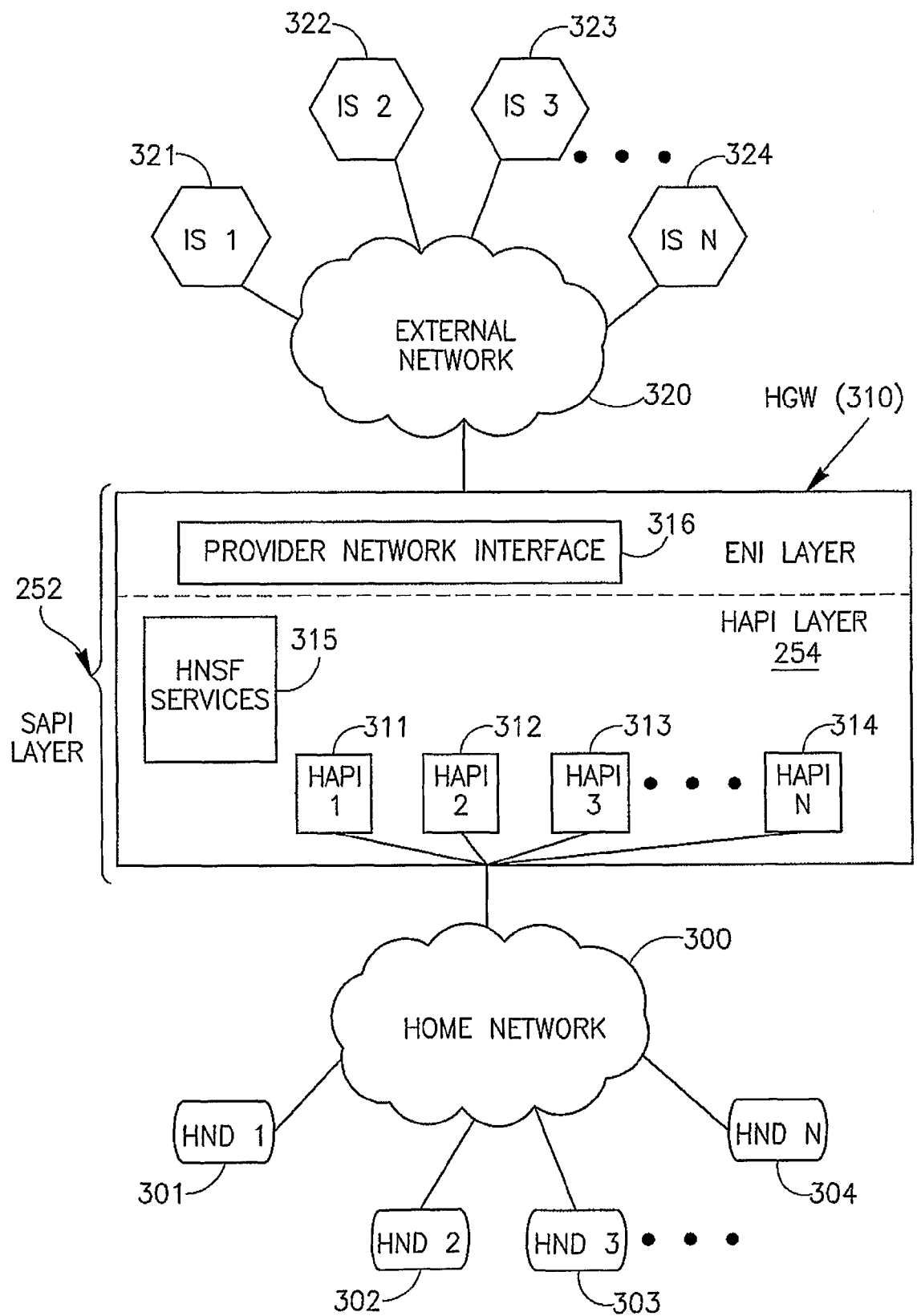
FIG. 3 is a schematic representation of the proposed Home Network API Layer in the Residential Gateway. The HAPI Layer serves to present a number of specified API modules to the Home Network and its devices masking all the details of the Internet Network and Internet Servers.

FIG. 3 illustrates a schematic block diagram of the newly proposed architecture of a Home (or Residential) Gateway HGW 310 serving for interconnecting a Nome network 300 and an External network 320. The HGW 310 is provided with a Service Application Program Interface (SAPI) layer 252, the main part of which is a Home network Application (HAPI) Layer 254. In the example of FIG. 3, the SAPI layer 252 of the Home Gateway 310 comprises also an External Network Interface 316 which can be considered an ENI layer 316. Alternatively, or in addition the External Network Interface can be distributed among network elements of the External Network (in this example, Servers 321-324 of the Internet network 320).

The HAPI Layer shall provide, to the HN devices HND1-HNDN (301-304), any of the known interfaces and some additional complementing interfaces in order to perform for the HN devices both old and new services without a need for the HNDs to interact "themselves" with network nodes outside the HN.

The side (preferably, only HNDs, but possibly also external network's IP servers 3421-324) that wishes to activate a service shall be responsible for activating the applicable HAPI Classes with the correct attributes/features and in the needed sequence in order to actualize the service. Some of the HAPIs may be "organizers" for other ones.

Once HAPI classes are defined and the HAPI layer is built in general, every service developer will be able to design new services or modify existing services by just creating a new process of activating the old (existing) or additional (new, different) HAPI classes, or by changing their specific attributes.

This methodology of new services creation shall allow the introduction of services by extending the HAPI Layer for new HNDs, and/or by Software (SW) upgrades to existing HNDs without any involvement of the Network or Service Provider. Specific OAM (Operations, Administration and Management) classes within the HAPI Layer shall perform the aspects of a service that must be coordinated with the provider, by activating predefined OAM HAPIs.

Example: Suppose the HGW and HNDs support Standard TV(STV) and a new Set-top-Box is introduced with High Definition TV (HDTV) Capabilities.

The new HDTV STB shall use the same HAPI elements of the STV service with modified attributes of Bandwidth required in the HN. All other attributes may remain unchanged. Note that the change of attributes means there is no need to change SW version of the RG (HGW). The HGW will have to ensure that the new bandwidth is delivered on the provider's network (BW, QOS). The HGW shall also have to ensure that the Service Provider delivers the service (authentication, Billing, specific streaming contents selection . . . ). However if we speak about the Home Network and devices in the HN, the same HAPI can implement both STV and HDTV.

For the development of Home Network Services, the developer has to understand the services he/she can receive from each and every HAPI and their Interface requirements in order to design a service. The developer does NOT need to understand anything about the Residential Gateway (HGW) nor the Internet (Provider, External) Network behind it.

With reference to FIG. 3, an HND (e.g. 301) that wishes to initiate a service shall define the parameters of the services HAPIs demand to be indicated (e.g. HAPI 1 (311) and HAPI 3 (313)) and send the service invocation messages to them. The interface between a Network Device and the HAPI layer can consist of a whole protocol, at the Internet layer, including specific order and timing of the messages.

The HAPI (311) then activates the required process to actualize the service. This is achieved by activating the proper networking and application layer protocols over the Internet Network to the Internet Servers (e.g. 324). In other words, the incoming Internet layer commands are terminated at the HAPI Layer 254, converted into the Application layer commands and, upon processing, issued at the Internet layer, for example via the ENI layer 316.

In this method, the actualization of Home Network Services is divided between two Networks, with the HGW (RG) serving as a service level mediator. There is no need to set-up sessions in which one end is in an HND and the other end is in an IS. Sessions are established from HND to HGW and HGW to IS separately. All real time and coordination/organizing issues, if needed, can be handled by a frame service HAPI module HNSF 315 in the HAPI Layer of the HGW.

With the HAPI layer, services for the HN are performed by the HGW and there is no need for the devices on the HN to know how to reach through the HGW and get services performed by an External Network Server. It is the HGW task to mask all the details of the Network outside and serve as a service level mediator between the two networks.

As has been mentioned in the Summary, typically two classes of HAPIs are provided in the HAPI Layer 254:
Class 1: HAPI Class for complete services
Class 2: HAPI Class Building Blocks Class 1 HAPI—shall be used for services being "master" or complete services upon which many services can expand. In the near term these HAPI will resemble the tailored solutions for Data Services, Voice Services and Video Services but they will differ from existing solutions by implementing them in the HGW as Proxy Services. This will allow the HGW to serve legacy HNDs, which are unable to address the HAPI for services.

Class 2 HAPI shall serve as building blocks for new services. The HND shall create services of concatenating and/or interleaving processes that activate these building blocks HAPIs. Although the HND does not reach through the HGW to get services on Internet Servers, the HGW shall implement this part of the service by performing the services requested by the HND over the Class 1+Class 2 HAPIs.

An additional HAPI type is a so-called frame service HAPI module (HNSF 315), which is responsible for interconnecting various HAPIs and creating interactions there-between for known and new services.
(Details and Examples of Various Classes of HAPIs will be Presented at the End of the Detailed Description Section)

Figure 4:
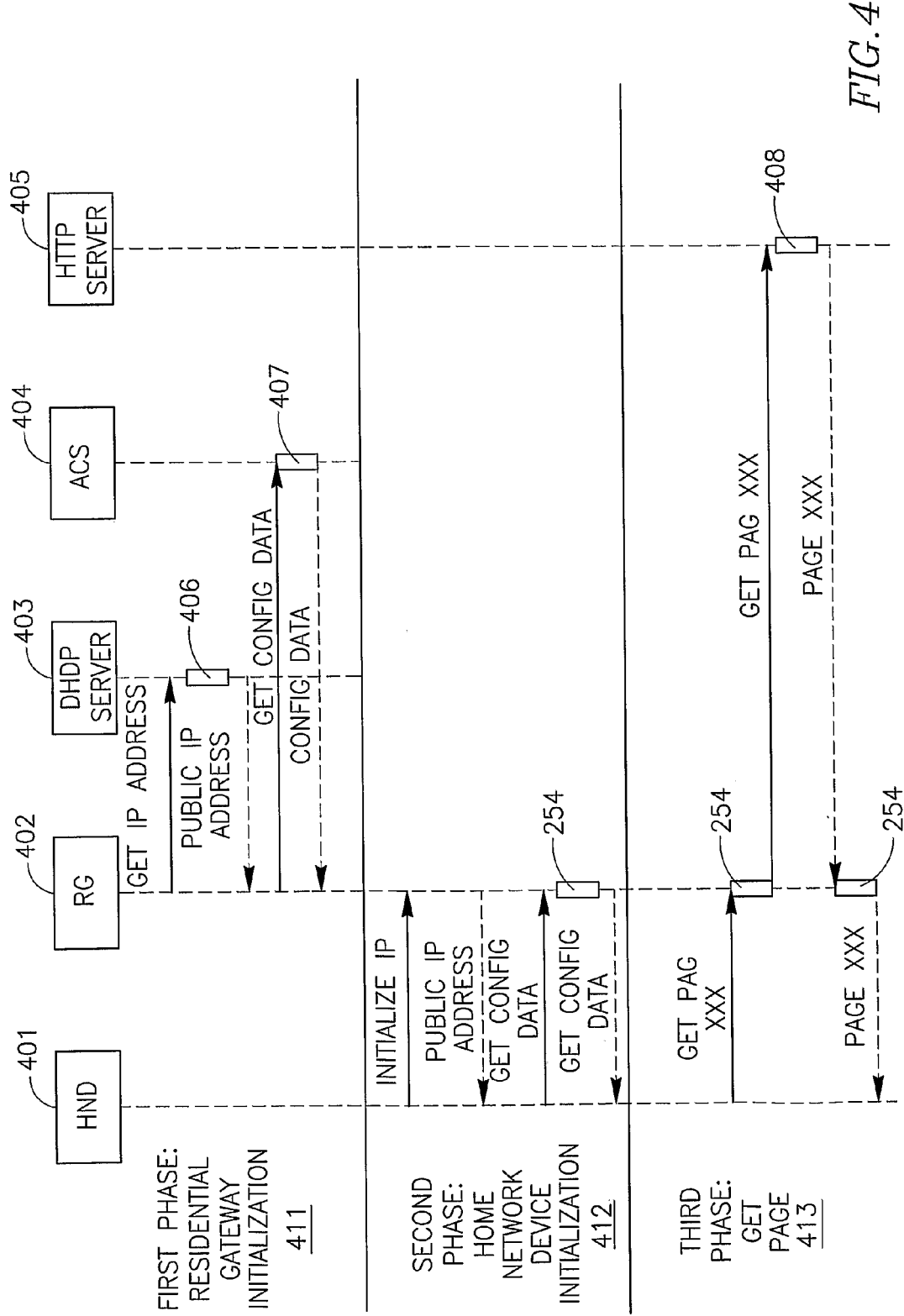
FIG. 4 provides a schematic representation of the message interactions needed to implement services for the Home Network using the API interface modules provided by the HAPI Layer.

FIG. 4 schematically demonstrates interaction between the HN Devices generally marked 401 and a newly proposed HGW (RG) 402 that incorporates the HAPI Layer. In Phase 1 (411), the RG is initialized whenever required. In Phase 2

Figure 1:
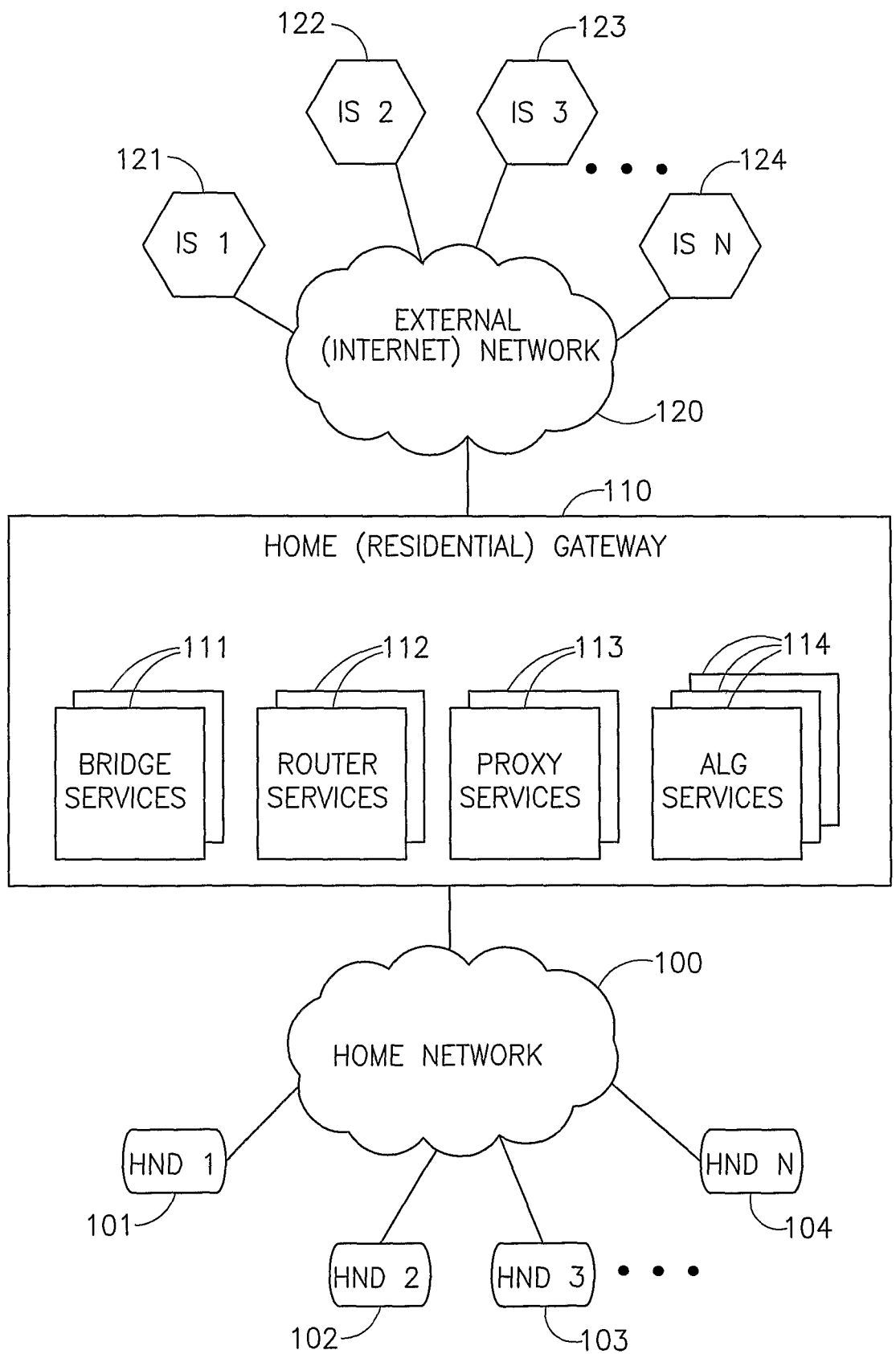
FIG. 1 (prior art) is a schematic representation of the current model for the Home Network attachment to the Internet Network via a residential Gateway.
Figure 2:
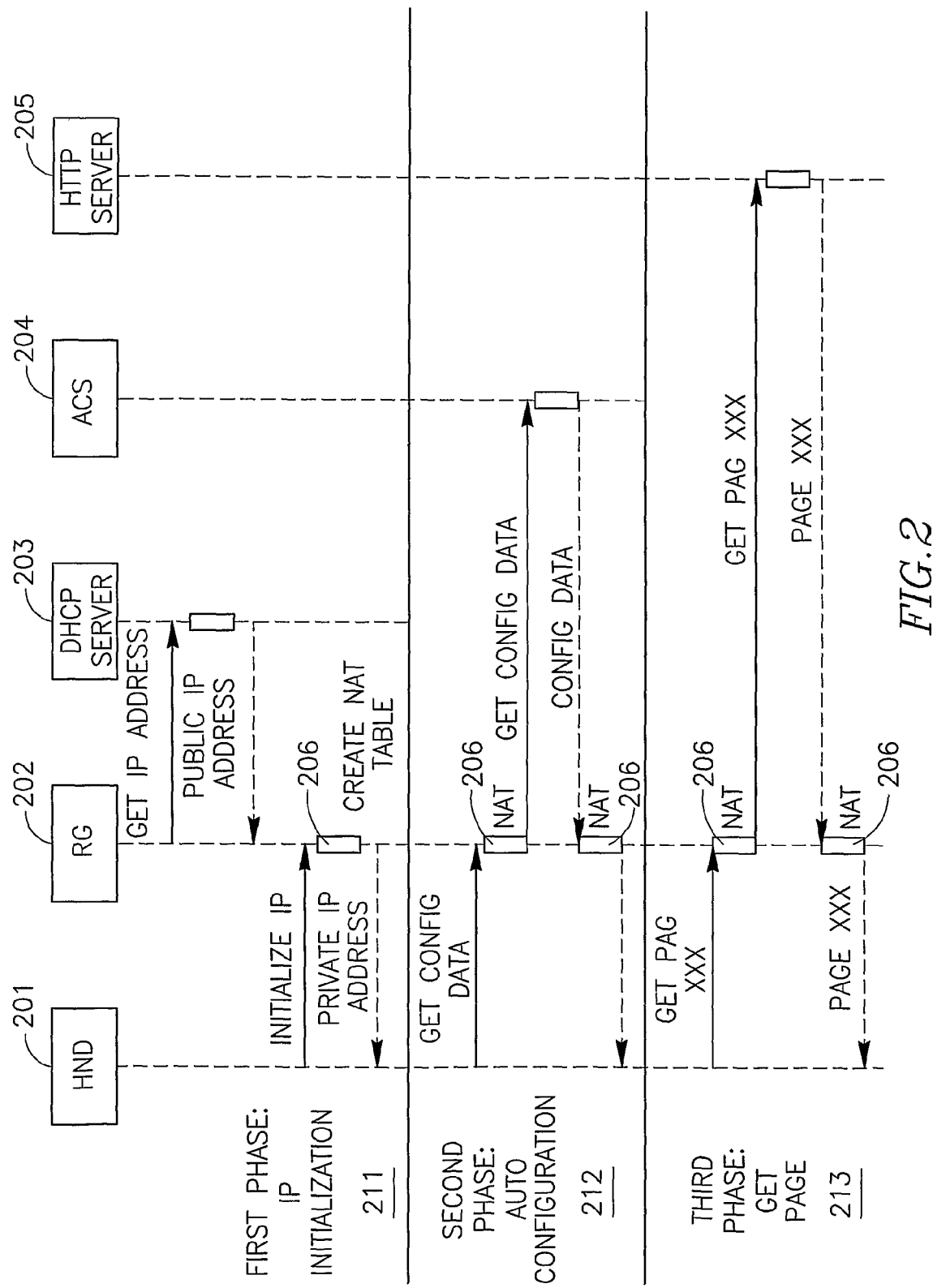
FIG. 2 (prior art) is a schematic representation of the messages involved in the implementation of a service from the Home network Device, via the Residential Gateway to the Internet Server via the Internet Network.

(412) any HND is initialized whenever required. In Phase 3 (413), the HND (401) can receive services by sending a service request to the RG (402). The RG (402) will implement the service towards the Internet Network Servers (such as 403, 404, 405) and come back with results to the HND (401) in the Home Network. The service demonstrated is a simple "Get Page" service. The HND (401) can ask the specific page in a high level HAPI request (in this example, using an Internet layer protocol). The RG (402) will provide the service by using the standard Internet protocols to get the page from an HTTP Server 405. Note, that the described and illustrated process does not comprise the complex NAT (Network Address Translation) function, which was absolutely necessary in the conventional Home Gateway (see FIG. 2). Internal communication and processing in the RG 402 is just converted into the Application layer, using HAPIs (the boxes at the border points are schematically shown as belonging to the HAPI Layer 254), without complex corrections of Internet addresses in the incoming and outgoing Internet layer commands. Boxes 406, 407, 408 symbolize respective IP Servers' interfaces, but in another embodiment may form part of ENI Layer of the RG 402.

FIG. 5 schematically demonstrates prior art actualization of services through the Home Gateway. The service actualization, through the different layers, is depicted by the line 506. The service may begin at HND's (505) application level, then passing over layer 3 i.e., Network Layer to HN (504). At the HGW (504) the service may be and is preferably handled at layer 3 or in some cases Layer 4 (NAT, path 507); sometimes it can be performed at Application Level (ALG, Path 508).

Then the service crosses the external network (502) over Layer 3 and arrives to the Internet Server (501) where it is converted to the Application level that provides the service required.

In contrast, FIG. 6 schematically depicts the protocol layer diagram of the current invention. The most important detail in the diagram is that, at the newly proposed HGW (603), there is no direct Layer 3 (Network Layer) connection between HN and EN. At the HGW (603), the service on the "HN side" is handled at the Application Layer commands by the activation of the HAPI layer modules of various classes (HAPI Layer 607). In some cases, the Application layer commands may pass in the same form to an optional External Network Interfaces layer (ENI Layer 609).

From the Application Layer commands at the HGW (603), the service continues to the EN IP realm of Layer 3 (i.e., already in the form of Internet layer commands) and crosses the EN (602) to the Internet Server (601) that performs the service at its application level. The service direction can be reverted. The service can be implemented from Internet Server (601) downwards to the HND (605), with utilizing the HGW (603), again splitting the Layer 3 connection and providing connectivity at the Application layer between the two IP realms: of EN (602) and HN (604).

(The Following Section of the Detailed Description is Intended to Disclose the HAPI Layer Details and Examples)

All the examples below assume that the phases—such as taking care of initialization, configuration and mutual discovery of all participants—are finished.

1. Class 1 HAPIs

Class 1 HAPI shall implement complete services. Exemplary services are:

1.1 Content Retrieval

The HND requires contents from a server in the Internet.

The HND sends the contents request with address to the HGW (the actual protocol for this can be HTTP as it is done today or a new protocol based on the Class 2 HAPI Class building blocks).

The RG employs standard Internet protocols to get the content. This may involve addressing the DNS Server to locate the address and IP of the server behind it. Then he may activate an HTTP get message to retrieve the contents.

When RG has all the contents he activates the "send" content part of the HAPI that brings the contents to the HND that requested it.

Note that with the HAPI Layer defined as a separate layer, there is no need for NAT in the HGW (RG). The RG operates two separate addressing schemes at each network (HN and IN) and there is no need to replace IP headers on the fly. The message will be received by RG with IN addresses and then a new message will be sent to HND with HN addressing.

1.2 VoIP Call

VoIP Call is an example of a complicated service. With today's technology the HND (a VoIP Phone) must implement the whole VOIP Protocol (SIP or H.323) in order to implement the service. This is not sufficient since the NAT functionality in the HGW (RG) will interfere with the VOIP services addressing data contained in the messages body. Therefore the RG must implement an ALG for VoIP or perform the task of the proxy for the service.

In our invention the HAPI for this function shall be much simpler, by the HND asking to make a call to No. XXX (or URI YYY or any other addressing scheme for voice that may be standard). The request shall be transferred to the RG over the VoIP HAPI.

The RG will then implement the whole process of the VOIP Protocol with all the servers in the IN. All these activities are transparent to the HND. When the RG is ready to set up the call end to end he notifies the HND (over the VoIP HAPI).

The voice part of the call is handled by the Real Time tunnel of the VoIP HAPI. This tunnel takes care to provide the QOS attributes of this media. To achieve this the RG negotiates QOS parameters with IN and HN (separately) and ensures the QOS shall be provided for the call.

The HND shall allow the user to make the call.

Tear down is performed in a similar way.

Any problems in the setup of the call shall be sent by HAPI messages from RG (HGW) to the HND.

The following are differences of this process from existing processes:

1. HND does not have to be VoIP Enabled, it only has to know (to apply to) the VoIP HAPI;
2. HND operates in the HN addressing scheme, used to carry IP messages for controls and media;
3. HGW operates two separate addressing schemes for HN and IN (External Network);
4. In today's technology QOS must be ensured from end to end through the RG; this is achieved by a network controller that can allocate QOS (Bandwidth, delay and delay jitter) in both IN and HN. In our invention QOS is partitioned to two different realms (IN and HN). In the RN, the RG shall be responsible to assure QOS. In the IN some other provider network shall take care of this up to the RG. Note the QOS can change while crossing the RG since the two networks may have different capabilities.

1.3 Other examples of Class 1 HAPI

1) IPTV services of all types Set-Top-Box activates a streaming session from the IN. The stream can be specific to the user (VOD), a Broadcast (BTV) or a Multicast (PPV, NVOD) stream).
2) Multimedia/Short Message service; Smart Phone send/receives an SMS or MMS message.
3) Conference Call; 4) Video Conference Class 2: Building Block HAPIs Class 2 HAPIs comprise building blocks of services. The building blocks can serve to create complete services therefrom. The building blocks can be used at all stages of traffic creation. The HGW (RG) shall also provide framework services (timers, mail-boxes, event detector etc) that will aid the service creation process by sequencing the proper method in the right timing. The timing depends on the presetting of the framework controller via the Framework HAPI. Some Class 2 HAPI Examples are presented below.

2.1 OAMHAPI Building Blocks

HND Discovery: Upon power on HND looks for RG and notifies him about HND capabilities. The RG may use this data to update Network/Service Provider on the change in the HN.

HND Authentication—RG may request to Authenticate RG.

RG Authentication—HND may Request to authenticate HND. Once HND is authenticated there is no need for additional authentication towards Network or Service provider.

HND Auto-Configuration—HND can ask and be configured by RG. Configuration Data may reside in RG or be requested from the Network, in both cases the HAPI for HND is the same.

HND Configuration Update—RG may change/update the configuration of HND. Origin of change request may be RG or Network but in both cases the HND uses the same HAPI.

HND Request for Configuration Update—HND may request change in its configuration from RG.

2.2 Streaming HAPI Building Blocks

HND Request Streaming Download—HND may ask for a streaming service. The request is received by RG (HGW). RG performs all the steps required to allow the service including:
Service request—service request attributes will contain name and parameters of contents to be streamed.
Contents Server (one of IP servers in the External Network) activates request for network resources to RG
RG activates network resources allocation for incoming stream.
The Contents Server activates a DRM (Digital Rights Management) session with RG, RG relays the session to HND. The DRM keys are located at HND and the Contents Server. RG does not change the DRM messages contents.
Also DRM updates will be relayed to allow HND continuous capability to present the stream.
Server sends contents to RG. RG handles the contents with the applicable QOS. The contents stream is relayed to HND over the HN.
RG (HGW) Requests Streaming Upload—Streaming contents can be uploaded from an HND to the network. The process is similar to download with source and destination reversed.

2.3 RG Framework HAPI

The RG shall provide framework services that will allow the HNDs and other HAPIs to create sequences of activities.
The Framework HAPI shall include:
2.4 Timers that can be preset to activate processes in the future or at preset intervals. Timers can be local or use external timers on the IN.
2.5 Event controller that shall allow conditioning of processes to specific events.
2.6 Mailboxes that allow transfer of information from one process to another.

Example of using the HAPI Framework:

The Service: Call a predefined list of phone numbers to invite them to a special Sale at the local store.

Implementation: The message is recorded and the list of phones defined. The Timers are set to start calling at date XX/YY/DD at MM:HH and call at each phone with intervals of P minutes. If there is no answer, than call again within Q hours.

3. Other modifications of the HAPI modules and HAPI modules combinations can be further provided:

3.1 Class 1 HAPI as Building Blocks

All Class 1 HAPI that can be used as is to create new services.

This type shall include combinations of class 1 and class 2 HAPI to create new services and variations of services.

EXAMPLES

Voice Call with Video of other party on TV screen.
This service involves the setup in parallel of a Voice and Video Call over IP using the VoIP HAPI. Then the Video has to be relayed to the Set Top Box for display on TV. The Video relay to TV can be performed using a traffic diversion HAPI that sends traffic stream to one HND instead of another.

3.2 Expanded Class 1 HAPI

The Expanded Class 1 HAPI Class allows breakpoint in the service implementation sequence so that the HND can take different actions in different situations. For example:

3.3 Expanded Content Retrieval Service

HND looks for specific contents (a web page, a document, a song, any Multimedia etc.).
The HGW provides an HAPI with the details of the contents (as they are known to the user in "human Language"
The HGW searches for the contents using search engines and presents the first response with separate display of other results.

In this example the HGW activates several building blocks that are offered to the HND via predefined HAPI Layer:
Activate Search Engines Method
Get contents Search Engine Reply Method
Present/stream first result
Present other results Method The Expanded Content Retrieval Service can be further expanded to include other activities like Billing:
HGW tries to fetch the contents but gets a request to pay
HGW transfers request to HND so that user can confirm the payment or instruct the RG to fetch the next result.

In this example the HAPI includes also: Interaction with User via HND and Payment Method that activated Secure session in the HGW.

Note that in this case all aspects of secure payments may reside in HGW only for all HNDs in the HN (including passwords, credit card data, authentication methods for other site etc). So the user does not have to input all this data and interact with other sites in order to make the payment. All data and interactive sessions may be provided by the HGW.

It should be appreciated that various additional HAPI modules can be created and introduced in the SAPI layer of the proposed Home Gateway in addition to the basic ones forming the functionally complete set of HAPIs for a Home Gateway serving a particular Home Network. The scope of the invention is defined by the claims which follow.

The invention claimed is:

1. A Home Gateway HGW positioned between and interconnecting a Home Network (HN) and an External Network (EN), wherein the HN operates at a Network layer, is connected to a plurality of home network devices HND and wherein the HGW being capable of communicating with the HN and EN at a Network layer and being provided with a unified Service Application Programming Interface Layer (SAPI Layer) comprising a group of Home network Application level Programming Interfaces (HAPIs);

said SAPI Layer being capable of performing, at an Application layer, mediator functions for supporting communication and services between said HN and EN, and between different HNDs, thus avoiding Network Addresses Translation (NAT), wherein said group of HAPIs comprises a HAPI responsible for interconnecting various HAPIs and creating interactions there-between for known and new services;

wherein said SAPI Layer comprises a Home network Application (HAPI) layer formed by said group of Home network Application level Programming Interface modules (HAPIs), and wherein each of said HAPIs comprising a predetermined Application level Programming Interface (API) to at least one of the home network devices HNDs, and wherein the HGW is operative:

to translate Network layer commands received from said HNDs and requesting communication and/or services, into Application layer commands, to handle said Application layer commands at the HAPI layer, to re-translate said Application layer commands back to the Network layer commands and to forward thereof to the external network EN, to translate Network layer commands received from said EN requesting communication and/or services and intended for the HN, into Application layer commands, to handle the Application layer commands at the HAPI layer, to re-translate said Application layer commands back to the Network layer commands, and to forward thereof to the home network (HN).

2. The HGW according to claim 1, being capable of terminating any one of Network layer communication and/or service commands incoming from the HN and the EN, converting said Network layer commands into Application layer commands, handling the Application layer commands within the HGW for ensuring required services and establishing required communication, and issuing outgoing commands as Network layer commands.

3. The HGW according to claim 1, suitable for communicating with the Home Network HN comprising a plurality of home network devices (HNDs) and the External Network EN comprising one or more external network devices (ENDs), wherein said SAPI enabling any one of the home network devices (HNDs):

a) to communicate with one or more of the external network devices ENDs via the HGW, regardless of the fact whether any of said HNDs has individual capability of communicating with the external network EN;

b) to order from the HGW and acquire there-from services involving participation of one or more of said HNDs and ENDs.

4. The HGW according to claim 1, further allowing communication and actualization of services in the opposite direction, by enabling external network devices ENDs belonging to the external network EN to communicate with the home network devices HNDs of the home network via the HGW by utilizing said mediator functions of the HGW.

5. The HGW according to claim 1, wherein said SAPI Layer comprises a functionally complete set of the HAPIs, being the set that enables performing, within the HGW, at least the functions that otherwise would have to be performed by individual capabilities of all the HNDs connected to the HGW.

6. The HGW according to claim 1, capable of translating Network layer commands, incoming the HGW from said HNDs and not requesting communication and/or services involving participation of the ENDs, into the Application layer commands to be handled at the HAPI layer for further re-translating said Application layer commands back to the Network layer commands to be issued to the HNDs.

7. The HGW according to claim 1, wherein said SAPI layer further comprises an External Network Interface Layer (ENI layer) for serving network devices of the External Network.

8. The HGW according to claim 1, wherein each of said HAPIs has the format of a client-server Application Programmed Interface (API), behaving as a server with HGW and as a client with HND, or vice versa.

9. A system comprising the Home Gateway (HGW) according to claim 1, wherein the system also includes a Home network comprising a plurality of Home Network Devices and an External Network comprising one or more External Network Devices, and wherein the HN being capable of communicating with EN via the HGW, and actualizing services via the HGW.

* * * * *